Aug. 12, 1969  L. O. STINE ET AL  3,461,061

HYDROGENATION PROCESS

Filed June 13, 1966

INVENTORS:
Laurence O. Stine
Robert A. Lengemann
Kenneth D. Vesely

BY: James R. Hoatson Jr.
Joseph C. Mason Jr.

ATTORNEYS

United States Patent Office 3,461,061
Patented Aug. 12, 1969

3,461,061
HYDROGENATION PROCESS
Laurence O. Stine, Western Springs, Robert A. Lengemann, Arlington Heights, and Kenneth D. Vesely, La Grange Park, Ill., assignors to Universal Oil Products Company, Des Plaines, Ill., a corporation of Delaware
Filed June 13, 1966, Ser. No. 557,262
Int. Cl. C10g 23/00; C07b 1/00
U.S. Cl. 208—57                                    1 Claim

ABSTRACT OF THE DISCLOSURE

Process for hydrogenating hydrocarbons wherein the feedstock is contacted first in liquid phase with hydrogenation catalyst in one reaction zone and subsequently the lighter components of the feed are contacted in vapor phase with a hydrogenation catalyst. The invention has particular applicability to the selective hydrogenation of heavy petroleum fractions, such as those boiling substantially above about 650° F.

---

Figure 1:
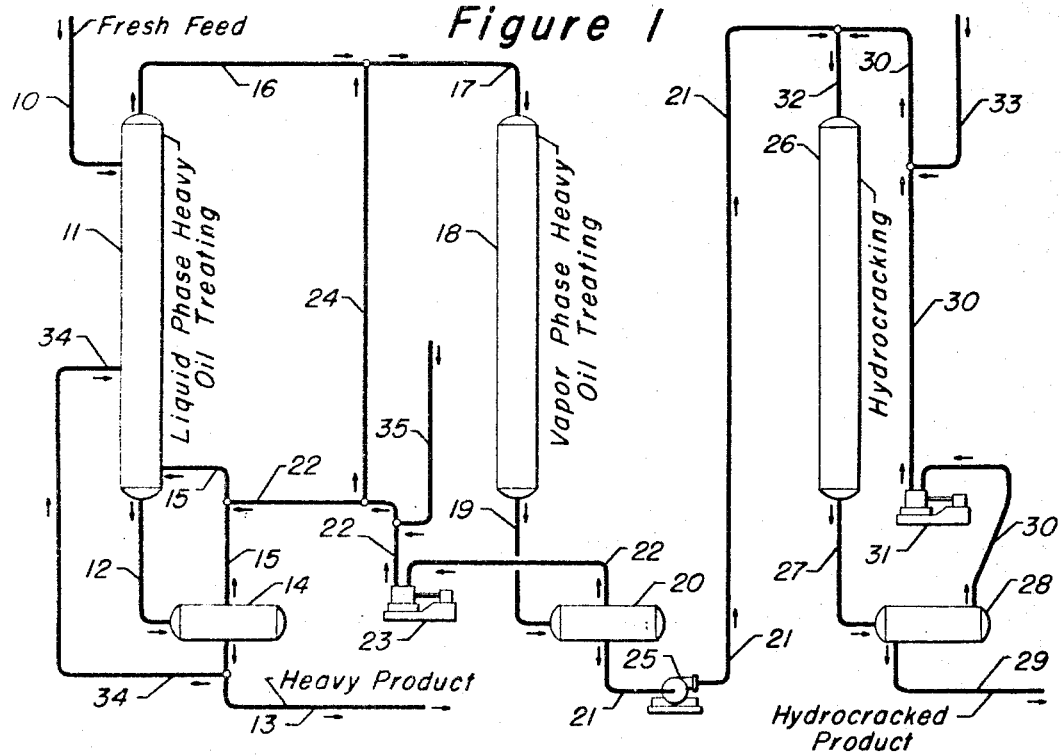

This invention relates to a hydrogenation process. It particularly relates to a process for hydrogenating constituents of hydrocarbon mixtures in order to, for example, saturate olefinic hydrocarbons and/or remove sulfur-containing constituents. It particularly relates to an improved manner for conducting processes wherein hydrocarbons are contacted with a plurality of stationary beds of granular solid catalysts in the presence of hydrogen-containing gas.

It is known in the art to contact hydrocarbon materials with hydrogen in the presence of a catalyst by passing the hydrogen and hydrocarbon materials through a stationary bed of solid catalyst. Generally, for improved operation, the oil to be treated is in vapor phase in order to achieve a relatively high rate of reaction and to materially decrease the deactivation rate of the catalyst. However, the vapor phase operation requires an extremely large amount of hydrogen, i.e. 3,000 to 10,000 standard cubic feet of hydrogen per barrel of oil, for effective desulfurization of an oil.

The prior art has also suggested that hydrogenation of hydrocarbon oil be accomplished in liquid phase such as by filling a reactor containing a catalyst with liquid hydrocarbon and then bubbling hydrogen gas through the liquid phase. However, in this type of operation, it was found that the reaction rate was exorbitantly slow and was a practical method of operation only if very mild hydrogenation of the oil was desired.

The major disadvantages of the prior art processes have been minimized in general by changing the process conditions such that the amount of hydrogen in contact with the oil is substantially increased, such as by increasing the hydrogen flow rate through the reaction zone using the well-known recycle hydrogen technique and/or by decreasing the oil flow rate such that the oil will pass over the catalyst in thin flowing films of oil. It was additionally found, however, that in such prior art processing schemes, as the amount of hydrogen and hydrocarbon in contact with the bed increases, the catalyst activity generally decreases through the formation of carbonaceous and tarry materials which tend to clog the active pore sites on the catalyst. This effect is at least partially a result of the fact that the desired hydrogenation and/or other reactions occur at a temperature above the decomposition point for certain hydrocarbon constituents in the feed stock. Heretofore no practical mode of minimizing catalyst deactivation has been shown, with the result that the prior art processes suffer from increased operating costs and increased catalyst costs.

It is therefore an object of the present invention to provide an improved process for the hydrogen treatment of certain constituents in hydrocarbon mixtures. It is another object to provide an improved process whereby hydrogenation is carried out simultaneously in both liquid and vapor phases. It is still another object of the present invention to provide an improved process for hydrogenating hydrocarbon oils with less catalyst deactivation than heretofore thought possible. It is a specific object of the invention to teach an improved two-step process for preparing a feed stock for a hydrocracking operation via selective hydrogenation of hydrocracking feed stocks.

Figure 2:
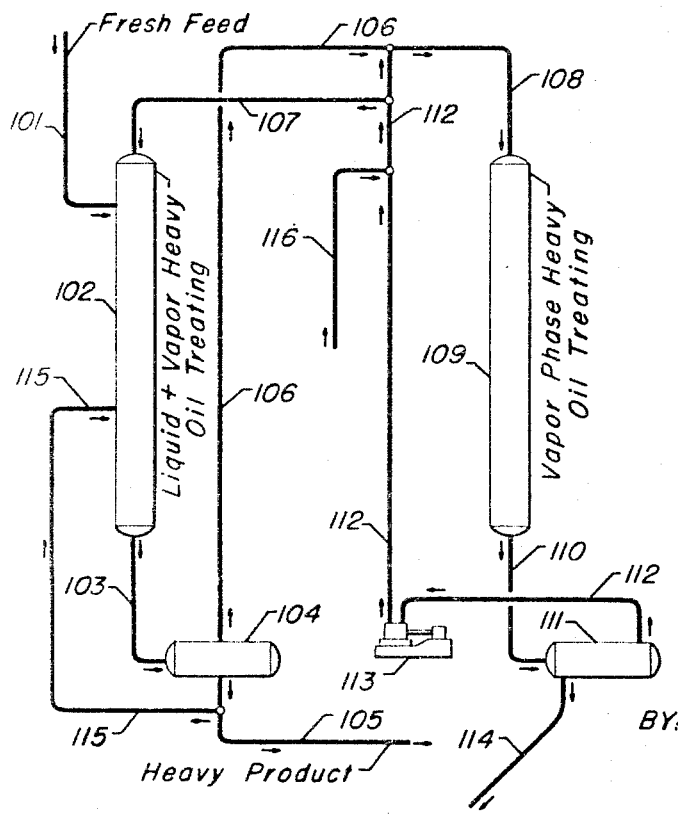

These and other objects of the invention will become apparent to those skilled in the art from the ensuing description of the invention and the appended drawings of which FIGURE 1 represents a simplified schematic flow diagram showing a broad embodiment of the invention, and FIGURE 2 represents a schematic flow diagram showing a specific embodiment of the invention.

According to the present invention, the hydrogenation of certain constituents in hydrocarbon mixtures is performed by an improved process which comprises contacting the hydrocarbon mixture, substantially in liquid phase, with hydrogen gas in a first reaction zone under conditions sufficient to hydrogenate at least part of said constituents and whereby a gaseous stream comprising vaporized portions of said mixture, vaporized portions of the hydrogenated constituents, and unreacted hydrogen gas is formed therein; separating said gaseous stream from the remaining liquid phase stream; contacting the gaseous stream in a second reaction zone in vapor phase with hydrogenating catalyst in the presence of sufficient added hydrogen gas to maintain the hydrocarbon vapors above the dew point thereof and under conditions sufficient to hydrogenate at least a portion of the hydrogenatable constituents contained in the hydrocarbon vapors; and removing hydrogenated hydrocarbons from both reaction zones as product streams.

Additional embodiments of this invention include the recycle of the liquid product stream from the first reaction zone to the first reaction zone at a locus, for example, in admixture with the feed stream, and includes the recycling of a portion of the hydrogen gas which is separated from the second reaction zone product stream to the first reaction zone at a locus, for example, whereby the hydrogen gas flow direction is counter-current to the hydrocarbon flow direction.

Thus, the present invention is based on the improvement which comprises having, preferably, counter-current contact between the liquid phase hydrocarbon to be hydrogenated and hydrogen, with simultaneous contact in a separate reaction zone in the vapor phase between a portion of the hydrocarbon to be hydrogenated and hydrogen gas. In this manner of operation, it was found that hydrogenating efficiency was significantly increased over that obtainable from prior art processes.

With reference to FIGURE 1, the invention may be practiced by introducing the hydrocarbon mixture feed stock via line 10 into catalytic hydrogenator 11. A major portion of the feed is passed downwardly in primarily liquid phase through the catalyst bed in counter-current contact with hydrogen-containing gas which has been introduced into the lower end of the catalyst bed via line 15. Generally, as the feed passes through this first reaction zone, the vaporized portions of the mixture, plus the vaporized portions of hydrogenated constituents, will total from 30% to 85% by volume, based on the feed mixture, depending upon the choice of operating conditions used by those skilled in the art. It is also to be noted that even though the feed mixture is introduced into catalytic hydrogenator 11 in primarily liquid phase, the vaporization which takes place therein is progressive; that is, as the feed mixture flows downwardly a greater and greater proportion of this mixture is vaporized as will be more fully discussed hereinafter.

Therefore, by careful control of hydrogenating conditions with respect to temperature and hydrogen flow rate, the amount of feed which is vaporized in the first reaction zone can be regulated accordingly. The vaporized portions of the feed, the vaporized reaction products, and unreacted hydrogen gas are removed overhead from hydrogenator 11 via line 16, and are passed through line 17 in admixture with added hydrogen-containing gas from line 24 into second catalytic hydrogenator 18 in vapor phase. This combined vapor feed mixture in catalytic hydrogenator 18, is passed downwardly in contact with hydrogenating catalyst in concurrent flow with hydrogen-containing gas. The total effluent from second catalytic hydrogenator 18 is removed via line 19 into receiver-separator 20. Receiver-separator 20 can also act as a condenser for the hydrocarbons contained in the effluent from catalytic hydrogenator 18. Separated hydrogen-containing gas is recycled from receiver-separator 20 via line 22 into the lower portion of catalytic hydrogenator 11 via lines 22 and 15, using compressor 23. A portion of this recycle stream is also introduced into the fed of the vapor phase hydrogenator 18 via line 24 as hereinabove discussed. Fresh hydrogen-containing gas, as needed, is introduced into the system via, for example, line 35.

The liquid portion of the feed, which has been subjected to liquid phase hydrogenation, is removed via line 12 and passed into receiver-separator 14. Receiver-separator 14 can also act as a condenser for any hydrocarbon vapors which are passed, either as absorbed in the liquid phase, and/or entrained in the liquid phase. Preferably, however, no cooling or condensing of this stream is attempted. Separated hydrogen-containing gas is recycled to catalytic hydrogenator 11 via line 15. The liquid hydrogenated product is removed as a product stream via line 13. Preferably, however, a portion of this relatively heavy liquid hydrogenated product is recycled via line 34 into catalytic hydrogenator 11 at a locus, for example, below the feed point to hydrogenator 11. This liquid recycle stream functions as a method of adding additional heat to the catalytic hydrogenator and supplies a means for continuously washing the catalyst particles, thereby removing the carbonaceous deposits and heavy tar materials from the pores of the catalyst, thus significantly decreasing the catalyst deactivation rate. If desired, this heavy recycle stream can be carried to extinction with no net product being removed from the first catalytic hydrogenator 11.

As mentioned hereinabove, the process of the present invention up to this point can be used to prepare a feed stock to a typical hydrocracking operation which has significantly reduced nitrogen and/or sulfur content. For example, the liquid hydrogenated product which has been collected in receiver-separator 20 and is passed through line 21 through pump 25 in admixture with hydrogen-containing gas into hydrocracking reactor 26 via line 32. Conventional hydrocracking conditions are used in hydrocracker 26, for example, the catalyst may comprise from 0.1% to about 35% by weight of the total catalyst, of nickel sulfide, and/or cobalt sulfide is the hydrogenating-dehydrogenating component dispersed, as by impregnation, on an active silicous catalyst support. The conditions in the hydrocracking zone include hydrogen partial pressures of at least 350 p.s.i.g., and temperatures below 900° F. The liquid hourly space velocity in the reaction zone can vary from about 0.1 to 10.

The effluent from hydrocracker 26 is passed via line 17 into receiver-separator 28. The hydrocracked product stream is recovered by line 29. The separated hydrogen-containing gas is passed via line 30 through compressor 31 into hydrocracker 26 in admixture with the feed stream in line 32. Fresh hydrogen-containing gas, as needed, is introduced into hydrocracker 26 via lines 33, 30 and 32. Since the hydrocracker feed stock had been uniquely prepared by the practice of the present invention, it was found that the hydrocracking catalyst had a lower deactivation rate thereby enabling an on-stream operation for longer periods at lower temperatures in order to achieve a given degree of conversion, such as 60%.

It can be seen from the above description that all of the gaseous material is passed over essentially dry catalyst in concurrent contact with hydrogen-containing gas thereby providing maximum hydrocarbon-to-catalyst contact. Additionally, the liquid phase operation is carried out such that the liquid hourly space velocity is reduced due to the holdup action of the entering hydrogen-containing gas; therefore, the reaction is carried more to completion in the liquid phase. Also, the recycle of the heavy hydrogenating product has the effect of significantly decreasing the catalyst deactivation rate through its washing and diluting action. The diluting action of the recycle stream is particularly important since increasing the viscosity of the materials collecting in the lower end of the catalyst bed prevents undesirable holdup of heavy tarry materials.

Reference is now made to FIGURE 2 for a more specific illustration of the practice of this invention. In similar fashion, a hydrocarbon mixture to be hydrogenated is fed into hydrogenator 102 via line 101. Hydrogen-containing gas in this embodiment is introduced into hydrogenator 102 via line 107. The entire feed mixture is passed downwardly in concurrent flow through the catalyst bed containing in hydrogenator 102 with progressive vaporization of this feed mixture as it passes through the catalyst bed. As mentioned hereinabove, the amount of total vapor formed, excluding hydrogen gas, should exceed 50% by volume based on said feed mixture, although it may range from 30% to 85% by volume.

The total effluent from hydrogenator 102 is passed via line 103 into separator 104, preferably without intermediate cooling. Liquid product is removed hot from separator 102 via line 105 for further handling as a product stream, such as cooling and collecting in a product tank. Preferably, however, a major portion of the liquid product stream in line 105 is recycled through line 115 into a catalytic hydrogenator 102 at a locus below the feed point.

The gaseous stream, comprising unreacted hydrogen, the vaporized portions of the hydrogenated product, and vaporized portions of the feed mixture, is passed through line 106 into vapor phase catalytic hydrogenator 109 in admixture with additional hydrogen-containing gas from line 112. Fresh hydrogen-containing gas is introduced, as needed, into the system via line 116.

The gaseous stream from liquid phase catalytic hydrogenator 102 is then passed downwardly over the catalyst bed contained in catalytic hydrogenator 109 in concurrent flow with the hydrogen-containing gas. The total effluent from the vapor phase hydrogenator is removed via line 110 into receiver-separator 111. Receiver-separator 111 can act as a condenser for the hydrocarbon portion of the effluent stream. Liquid hydrogenated product is removed from the system via line 114 as a product stream or as a feed stream to a catalytic hydrocracking operation as discussed hereinabove. Unreacted hydrogen-containing gas is recycled via line 112 and compressor 113 in concurrent fashion with the vapor feed to catalytic hydrogenator 109 and with the liquid feed in catalytic hydrogenator 102.

It is noted from the above description of this embodiment of the invention that in both the liquid phase operation and the vapor phase operation the flow of the hydrogen-containing gas with respect to the hydrocarbon feed over the catalyst particles, is concurrent. By operating in this manner, it was found that economies of operation were introduced into the unit which had not heretofore been possible. Additionally, it was found that greater hydrogenating efficiency was achieved as evidenced by a surprisingly increased reduction in nitrogen content and sulfur content.

It is readily seen from the detailed description given hereinabove for the two embodiments of the invention, that many improvements over the prior art processes can be realized. For example, those skilled in the art can recognize the excellent flexibility of the inventive process whereby any desired amount of the feed can be vaporized for the more selective hydrogenation in the vapor phase reactor. The liquid phase operation has the added feature of utilizing recycled hydrocarbon oil in such a manner that those skilled in the art can variably adjust the oil-to-catalyst contact ratio in any desired manner thereby providing excellent flexibility in the control of the quality of the final hydrogenated product.

The following example illustrates the invention:

EXAMPLE

A crude oil having the following properties was processed over a conventional cobalt-molybdate catalyst [1] according to the flow scheme shown in FIGURE attached hereto:

| | |
|---|---|
| Gravity, °API at 60°F | 20.3 |
| Specific gravity, at 60°F | 0.9321 |
| Total sulfur, wt. percent | 4.24 |
| Nitrogen content, wt. percent | 0.20 |
| Conradson carbon residue, wt. percent | 10.02 |
| Viscosities: | |
| Kinematic at 100°F., cst | 83.93 |
| Universal at 100°F., secs | 389 |

| 100 ml. distillation: | F-1 Engler | Vacuum Engler |
|---|---|---|
| IBP | 204 | 203 |
| 5% | 294 | 294 |
| 10% | 344 | 344 |
| 30% | 572 | 620 |
| 50% | 667 | 809 |
| 70% | 695 | 905(60%) |
| 90% | 716(80%) | |
| 95% | | |
| Percent recovered | 88.5 | 67.0 |
| Percent bottoms | | 33.0 |
| Percent loss | 0.3 | 1.0 |
| Percent coke, by weight | 11.2 | |

Using this feed stock, the following runs were made and with indicated operating conditions, were utilized to advantage:

| | Reactor No. 1 | | Reactor No. 2 | |
|---|---|---|---|---|
| | Run 1 | Run 2 | Run 1 | Run 2 |
| Pressure, p.s.i.g | 1,500 | 1,500 | 1,500 | 1,500 |
| Temperature, °F.: | | | | |
| Top | 760 | 790 | 760 | 800 |
| Bottom | 760 | 782 | 760 | 790 |
| $H_2$ recycle, s.c.f./b | 3,520 | 10,810 | 10,180 | 15,810 |
| Volume percent of feed vaporized | 30.0 | 86.5 | | |

By operating in the manner noted above, the following product properties were obtained:

| | Run 1 | Run 2 |
|---|---|---|
| Reactor No. 1, bottoms product: | | |
| Gravity, °API at 60° F | 18.9 | 16.3 |
| Engler, ° F.: | | |
| IBP | 249 | |
| 5% | 406 | |
| 10% | 515 | |
| 30% | 652 | |
| 50% | 671 | |
| Total sulfur, wt. percent | 2.42 | |
| Total nitrogen, p.p.m | 2,270 | 2,870 |
| Kinematic viscosity at 210° F., cst | 200 | |
| Conradson carbon, wt percent | 10.51 | |

| | Run 1 | Run 2 |
|---|---|---|
| Reactor No. 2, bottoms product: | | |
| Gravity, °API at 60° F | 45.6 | 34.8 |
| Engler, ° F.: | | |
| IBP | 181 | 188 |
| 5% | 234 | 242 |
| 10% | 260 | 280 |
| 50% | 419 | 574 |
| 90% | 560 | 760 (85%) |
| 95% | 584 | |
| EP | 600 | |
| Total sulfur, wt. percent | 0.08 | 0.50 |
| Total nitrogen, p.p.m | 10.90 | 559 |

[1] 2.2% cobalt; 5.7% molybdate on alumina base.

It is evident from the above data that the two major factors effecting the percent of crude vaporization are the reactor temperature and the hydrogen recycle rate in the liquid phase reactor. Thus, excellent efficiency and facility of operation were achieved by varying the mode of operating the invention. For example, there can be derived from the data presented hereinabove that, if desired, 92% nitrogen removal and 96% sulfur removal could be achieved by vaporizing the feed such that 96% to 99% by volume of the feed were processed through the vapor phase reactor.

The process of this invention is suitable for any process involving the contacting hydrogen and liquid hydrocarbon. It is equally applicable to those hydrocarbon mixtures which are at least partially vaporizable under the conditions contemplated for hydrogenation. It is also equally applicable to heavy petroleum factions such as those boiling substantially above about 650° F., e.g., a reduced crude. In the practice of this invention lubricating oils can be decolorized and/or desulfurized; unsaturated aliphatic or aromatic constituents in gasoline may be saturated; linseed oils can be converted to a solid; the hydrocarbons $C_{17}H_{32}$ and $C_{17}H_{30}$ can be converted to heptadecene; the ethyl ester of linoleic acid can be converted to the ethyl ester of stearic acid; residual petroleum oil can be converted to lower boiling range products and/or contaminants therein can be reduced; etc.

The operating conditions for the hydrogenating reaction overall are well-known to those skilled in the art. For example, the desulfurization of lubricating oils, e.g. those boiling between 400° F. and 800° F., is performed at temperatures ranging from 400° F. to 1,000° F. and pressures from 150 p.s.i.g. to 10,000 p.s.i.g. On the other hand, the hardening of vegetable and marine oils is performed at temperatures from 100° F. to 400° F. at only slightly elevated pressures, e.g. 50 p.s.i.g. to 150 p.s.i.g. Liquid hourly space velocities in almost all cases will be from 0.1 to 20. Those skilled in the art know how to choose the proper operating conditions according to the components of the system.

In the example used to illustrate the practice of this invention, the hydrocarbon feed mixture comprised crude petroelum oil. The preferred operating conditions for such a system for the first reaction zone will include a temperature from 400° F. to 900° F., pressure of from 100 p.s.i.g. to 5,000 p.s.i.g., liquid hourly space velocity of from 0.1 to 20, and a hydrogen gas flow rate of from 5,000 to 25,000 s.c.f. per barrel of feed mixture. The amount of hydrogen gas passed into the vapor phase reactor can be adjusted by those skilled in the art according to the amount of hydrocarbon vapors desired to be treated in the vapor phase reactor according to the techniques disclosed herein for practicing the invention.

As used herein, the term "hydrogen-containing gas" is intended to embody hydrogen, water gas, or other commercial gas mixtures containing hydrogen. Usually the gas mixture will contain at least 40% hydrogen by weight.

Any suitable granular solid hydrogenation catalyst can be employed in the process according to the invention, e.g. cobalt, molybdenum, platinum, iron, nickel, oxides or sulfides of such metals, etc. Conventional carriers of the catalyst can also be employed, e.g. silica gel, alumina, bauxite, clay, activated carbon, etc.

The invention claimed:
1. Process for hydrogenating heavy petroleum fractions which comprises:
  (a) introducing a heavy petroleum feed mixture into a first fixed bed catalytic reactor maintained under hydrogenating conditions at an upper portion of said bed;
  (b) introducing hydrogen containing gas into a lower portion of said bed;
  (c) passing at least a portion of said feed downwardly in primarily liquid phase through the bed in countercurrent contact with upwardly rising hydrogen gas whereby the rising gas acts as a stripping medium within said bed for vaporized portions of said feed and vaporized portions of the hydrogenated constituents;
  (d) withdrawing a gaseous stream comprising vaporized portions of said feed, vaporized portions of hydrogenated constituents, and unreacted gas from the upper end of said first reactor, and withdrawing a remaining liquid phase from the lower end of said first reactor;
  (e) introducing said gaseous stream in vapor phase into a second fixed bed catalytic reactor maintained under hydrogenating conditions including the presence of hydrogen gas sufficient to maintain hydrocarbon vapors above the dew point thereof;
  (f) recovering hydrogenated hydrocarbons; and
  (g) recycling at least a portion of the liquid phase of Step (d) to said first bed in liquid phase.

References Cited

UNITED STATES PATENTS

| | | | |
|---|---|---|---|
| 3,132,089 | 5/1964 | Hass et al. | 208—57 |
| 3,162,594 | 12/1964 | Gorin | 208—57 |
| 3,186,935 | 6/1965 | Vaell | 208—143 |
| 3,239,449 | 3/1966 | Graven et al. | 260—667 |
| 1,940,650 | 12/1933 | Russell | 208—108 |
| 2,303,118 | 11/1942 | Frey | 208—143 |
| 2,952,625 | 9/1960 | Kelley et al. | 208—254 |
| 2,993,855 | 7/1961 | Fear | 208—213 |
| 3,026,260 | 3/1962 | Watkins | 208—254 |
| 3,222,272 | 12/1965 | Bercik et al. | 208—254 |
| 3,159,564 | 12/1964 | Kelley et al. | 208—89 |

HERBERT LEVINE, Primary Examiner

U.S. Cl. X.R.

208—58, 59, 143, 210, 264